United States Patent
Chhiber et al.

(10) Patent No.: US 10,301,075 B2
(45) Date of Patent: May 28, 2019

(54) METHOD OF SEALING A BAG FOR CONTAINING A BALE OF COMPRESSIBLE MATERIAL

(71) Applicant: Signode Industrial Group LLC, Glenview, IL (US)

(72) Inventors: Gurpreet Chhiber, Wheeling, IL (US); Kevin A. Bruzzesi, Linden, VA (US); Patricia Chidiac Maneri, Evanston, IL (US); Joseph E. Lininger, Union Grove, WI (US); Timothy B. Pearson, Antioch, IL (US)

(73) Assignee: Signode Industrial Group LLC, Glenview, IL (US)

( * ) Notice: Subject to any disclaimer, the term of this patent is extended or adjusted under 35 U.S.C. 154(b) by 46 days.

(21) Appl. No.: 15/618,943

(22) Filed: Jun. 9, 2017

(65) Prior Publication Data
US 2017/0355492 A1    Dec. 14, 2017

Related U.S. Application Data

(60) Provisional application No. 62/349,443, filed on Jun. 13, 2016.

(51) Int. Cl.

| | |
|---|---|
| *B65B 27/12* | (2006.01) |
| *B65D 33/20* | (2006.01) |
| *B65B 7/02* | (2006.01) |
| *B65B 51/02* | (2006.01) |
| *B65D 33/22* | (2006.01) |
| *B65D 85/07* | (2017.01) |
| *C09J 7/30* | (2018.01) |
| *B65B 51/06* | (2006.01) |
| *B65B 51/07* | (2006.01) |

(Continued)

(52) U.S. Cl.
CPC ............... *B65D 33/20* (2013.01); *B65B 7/02* (2013.01); *B65B 7/04* (2013.01); *B65B 27/125* (2013.01); *B65B 51/02* (2013.01); *B65B 51/062* (2013.01); *B65B 51/07* (2013.01); *B65B 51/146* (2013.01); *B65D 33/22* (2013.01); *B65D 85/07* (2018.01); *C09J 7/30* (2018.01); *B65D 31/10* (2013.01); *C09J 109/06* (2013.01); *C09J 131/04* (2013.01); *C09J 2201/36* (2013.01); *C09J 2201/606* (2013.01); *C09J 2201/61* (2013.01); *C09J 2409/00* (2013.01); *C09J 2423/04* (2013.01); *C09J 2433/00* (2013.01)

(58) Field of Classification Search
None
See application file for complete search history.

(56) References Cited

U.S. PATENT DOCUMENTS

| | | | |
|---|---|---|---|
| 2003/0113533 A1* | 6/2003 | Husemann | C09J 7/25 |
| | | | 428/343 |
| 2013/0305662 A1 | 11/2013 | Nyckowski et al. | |

(Continued)

*Primary Examiner* — Barbara J Musser
(74) *Attorney, Agent, or Firm* — Levenfeld Pearlstein, LLC

(57) ABSTRACT

A sealing patch for a polymeric bag includes a carrier, a pressure sensitive adhesive on the carrier and a heat-activated material on the pressure sensitive adhesive. A high-strength polymeric bag is formed from woven tapes and is coated with a polymer material. The sealing patch is positioned on the bag for sealing the bag. A method for sealing a high-strength polymeric bag with a sealing patch and a device for sealing a polymeric bag with a sealing patch are disclosed.

4 Claims, 2 Drawing Sheets

(51) Int. Cl.
  *B65B 51/14* (2006.01)
  *B65B 7/04* (2006.01)
  *C09J 131/04* (2006.01)
  *C09J 109/06* (2006.01)
  *B65D 30/20* (2006.01)

(56) References Cited

U.S. PATENT DOCUMENTS

| | | |
|---|---|---|
| 2014/0158560 A1 | 6/2014 | Nyckowski et al. |
| 2014/0360140 A1* | 12/2014 | Honegger ............. B65B 27/125 53/492 |
| 2015/0075118 A1 | 3/2015 | Pearson et al. |

* cited by examiner

METHOD OF SEALING A BAG FOR CONTAINING A BALE OF COMPRESSIBLE MATERIAL

CROSS-REFERENCE TO RELATED APPLICATION DATA

This application claims the benefit of and priority to Provisional U.S. Patent Application Ser. No. 62/349,443, field Jun. 13, 2016, the disclosure of which is incorporated herein in its entirety.

BACKGROUND

Compressible materials, such as fibers and the like, are often bundled or baled for handling and storage. One example where the material to be compressed and bundled (or baled) is cotton. The cotton (referred to as lint) is compressed in a press or baler to form a bundle or bale. In a known operation, the bale is secured by multiple straps or wires to maintain the bale configuration and stability, and then the bale is wrapped for protection, for example, in a wrap or bag, to protect the cotton from exposure to the environs, dirt, debris or factors that can affect the quality of the baled material, whether it is cotton or any other compressed and baled material. Such wrapping or bag materials are typically made of polyethylene, polypropylene, cotton and the like.

In order to increase the efficiency of the baling and bagging operation, automated systems have come in to use. One such system is disclosed in Nyckowski, et al., published US patent applications, Publication Nos. 2013/0305662 and 2014/0158560, the disclosures of which are incorporated herein in their entirety. In the systems disclosed in the Nyckowski publications, bales of compressible material, such as cotton, are compressed to form bales and inserted directly into a bag in an automated system without the use of straps or wires.

The bales tend to expand after they are compressed. As such, issues may arise with respect to the strength of the bag materials used to contain the bales. One system contemplates using bags made of polymeric materials that are sufficiently strong to contain the compressed bales and to prevent or limit expansion. One high-strength bag is formed from polyethylene terephthalate (PET) tapes that are woven together or loomed to form an elongated tube. The tube can then be folded to form lengthwise gussets and cut to size for individual bags. One end of the tube is sealed, as by stitching to form the bag, leaving the other end open for receiving the compressed bale. Following baling and bagging, the bales are discharged from the system and the open end of the bags are folded and sealed.

Present sealing methods include stitching, stapling, and the use of cable-ties or zip-ties. However, each of these methods has its drawbacks. For example, stitching is a labor intensive operation. An operator must secure the bag and use a stitching or other device to stitch along the entirety or nearly the entirety of the opening. It may also require moving or manipulating the bagged bale in order to access the open area or sealing area. Such an operation requires special equipment and extensive labor operations to seal the bagged bale. In addition, stitching necessarily results in perforations of the bag along the stitch line, which can allow contaminants to enter the bag and can become a weakened point on the bag.

Stapling likewise has its drawbacks. It too requires special equipment, i.e., an industrial stapler and consumables, staples. As with stitching, it is a labor intensive operation that may require moving or manipulating the bales in order to access the seal area. In addition, staples may come loose from a bale and can enter the material, which can contaminate the material or may come loose and jam within the system or otherwise cause problems with the baling or sealing operation. And, stapling can be inconsistent. That is, one bale may be stapled properly, while another may not, which can result in contamination of a bale, or a bag opening and the contents escaping from the bag. Moreover, like stitching, stapling by necessity perforates the bag which can allow contaminants to enter the bag and can create a weakened region of the bag. Another drawback is that staples can result in debris in the plant area around the bagging and sealing operation.

Cable- or zip-ties are also known to be used to seal bags. However, these are labor intensive and require that larger holes be made in bags to insert the ties through bag creating opportunities for contaminant ingress and weakened regions in the bag. In addition, like staples, portions of the ties may come loose from a bale and contaminate the material contained within the bag or jam within the system or otherwise cause problems with the baling or sealing operation. A further drawback is that cable and zip-ties can result in debris in the plant area around the bagging and sealing operation.

Heat sealing is another known method to seal bags, generally. However, the operating characteristics of any heat sealing technique are dependent upon the materials being heat sealed, as well as the material contained within the bag. Employing heat sealing to seal a PET bag being used to contain certain materials, such as cotton, has certain drawbacks due to the high melting point needed to properly form a seal in PET materials. The sealing temperature needed for PET bags is greater than about 450° F. This temperature is too high for use in many compressible materials applications, such as cotton, which has an ignition temperature of about 500° F. Since the melting point of PET is close to the ignition temperature of cotton, using a heat seal to seal bags made of PET that are being used to contain cotton bales may not be feasible.

There is therefore a need for an improved sealing system for bags used to contain highly compressible material, such as cotton, without straps or wires. Desirably, such as system uses heat sealing to seal bags containing the material. More desirably still, such a method can use a lower heating temperature so as to avoid nearing the ignition temperature of materials in the bag, such as cotton. Still more desirably, such a system can use shorter heating times to increase throughput and to reduce the labor required to form the seal.

SUMMARY

Various embodiments of the present disclosure disclose a sealing patch for sealing a bag made of a high-strength material that contains a highly compressible material (such as a compressed cotton bale) without wires or straps. The sealing patch of the present disclosure permits sealing the bag such that the bag is sealed without the use of stitching, staples or zip-ties. In an embodiment, the sealing patch is a heat-activated sealing patch which includes a carrier, a pressure sensitive adhesive (PSA) layer on the carrier and a heat-activated material, such as a heat-activated film (HAF) layer on the pressure sensitive adhesive layer.

In an embodiment, the carrier is a release sheet and the pressure sensitive adhesive is applied to the release sheet. The heat-activated film is applied to the pressure sensitive adhesive to form the sealing patch. The heat-activated film and pressure sensitive material are coextensive with one another.

In an embodiment, the pressure sensitive adhesive is a viscoelastic material, such as an acrylic formulated with butadiene styrene and the heat-activated material is an EVA material. One heat-activated material has a heat activation temperature of about 325° F. to about 375° F.

An embodiment of a bag that incorporates a sealing patch of the present disclosure includes a bag formed from a base polymeric material having a melting point, and a polymeric coating material on an outer surface of the base material that has a lower melting point than that of the base material. In an embodiment, the base material of the bag is made of PET. In such an embodiment, the PET base material is formed from PET tapes woven or loomed to form a tube. The polymeric coating is applied to one side of the tube, for example, the outside of the tube. In an embodiment the coating is a polyethylene material.

In an embodiment, the bag includes longitudinal folds that are made in the tube to form gussets or side panels. A transverse cut is made in the tube and one end of the cut tube is then sealed, as by stitching, to form the bag. The other end of the bag is left open for receiving the compressed bale. In an embodiment, the bag has a pair of first and second opposing major flaps and a pair of minor flaps between the major flaps. The sealing patch is positioned on the first major flap with the pressure sensitive adhesive adhered onto the coating material on the outer surface of the bag.

A method is disclosed for sealing a polymeric bag having a sealing patch, in which the bag is formed from a base polymeric material having a melting point, and a polymeric coating material on an outer surface of the base material. The coating material on the bag has a melting point less than the melting point of the base material, and the sealing patch has a pressure sensitive adhesive side and a heat-activated material side.

In an embodiment, the method includes a base material of the bag that is PET. In such an embodiment, the PET base material is formed from PET tapes woven or loomed to form a tube. The polymeric coating is applied to one side of the tube, for example, the outside of the tube. In an embodiment of the method the coating is a polyethylene material.

In an embodiment, the method includes folding the minor flaps inward onto the material, and then folding the first major flap (on which the sealing patch is positioned) inward onto the minor flaps. The second major flap is then folded inward onto the first major flap so as to overlie the sealing patch. Heat is then applied to an outer surface of the bag, over the coating, to activate the heat-activated material to adhere the first and second major flaps to one another.

In an embodiment, the method includes applying heat to effect a temperature of about 325° F. to about 375° F. in the heat-activated material. At this temperature, the heat-activated material of the sealing patch is sufficiently heated to activate the heat-activated material which fuses with the PET material with which it is in contact. This temperature range is sufficiently high to activate the heat-activated material and to fuse the heat-activated material with the bag base material, such as PET, but is not so high as to cause combustion of the material (such as cotton) contained in the bag. The method thus allows the use of heat sealing to seal a bag containing a bale of highly compressed material at temperatures sufficiently high to create a dependable seal, without adversely affecting the integrity of (for example, igniting) the compressed material within the bag. The method can further include cooling the bag to a temperature to allow personnel handling of the sealed bag.

A device for heat sealing a polymeric bag having a sealing patch thereon, includes a frame, a compression element mounted for movement relative to the frame and a compression element drive, a heating element mounted for movement relative to the frame and a heating element drive. In an embodiment, the compression element is configured to apply pressure to an area of the bag over the sealing patch and the heating element applies heat to the bag in area to heat seal the bag to the sealing patch. The compression element drive and the heating element drive can be reciprocating cylinders. In an embodiment, the compression element and/or the heating element can be mounted to their respective drives by movable mounts.

These and other features and advantages of the present method, system and device will be apparent from the following detailed description, in conjunction with the appended claims.

DETAILED DESCRIPTION

Various embodiments of the present disclosure provide a seal patch 10, a bag 12 sealed using the sealing patch 10, a method for sealing a bag 12 containing a bale of compressible material and a device 14 for sealing such a bag 12.

Figure 1:
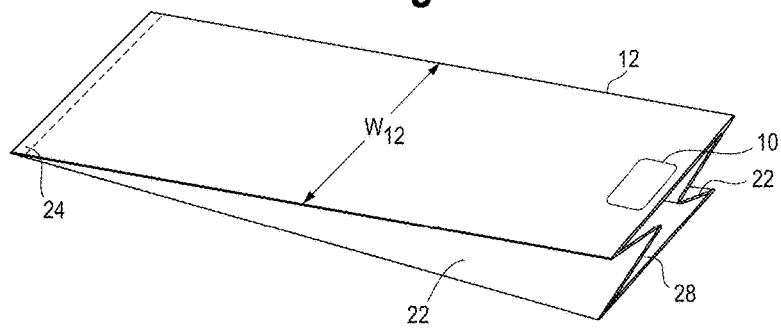
FIG. 1 is a perspective illustration of an example embodiment of a bag for containing compressible material, which bag includes a sealing patch for use in heat sealing the bag.

Referring now to FIG. 1, one example embodiment of a bag 12 having a sealing patch 10 is shown. Such a bag 12 can be used, for example, to contain a bale of compressible material in the bag 12 without straps or wires. Compressible materials include, but are not limited to, cotton compressed into bales.

In an embodiment, the patch 10 includes a pressure sensitive adhesive (PSA) 16 on one side and a heat-activated film (HAF) 18 on an opposite side. The adhesives 16, 18 are of the type that maintain functionality or maintain their adherence characteristics when subjected to environmental factors, including wet conditions, temperature fluctuations and humidity.

Figure 2:
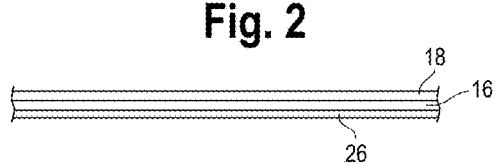
FIG. 2 is a cross-sectional illustration of an embodiment of the seal patch with a release sheet thereon, and prior to application to the bag.
Figure 3:
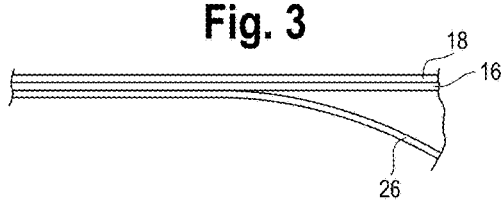
FIG. 3 is a cross-sectional illustration of the sealing patch with a portion of the release layer peeled away to expose the pressure sensitive adhesive.

The patch 10 illustrated in FIGS. 2 and 3 includes the heat-activated film 18 in direct contact with the pressure sensitive adhesive 16. It is anticipated such an adhesive patch 10 will be fabricated with the patch material carried on a release sheet 26 or other carrier adjacent to the pressure sensitive adhesive 16 side so that the patch 10 can be fabricated, handled and stored without misapplying the patch 10 to an object and without patches 10 sticking to one another. It is also anticipated that the patch 10 will be fabricated by applying the PSA 16 to the carrier 24, such as by laminating, spraying or otherwise coating the carrier 24, and then applying the heat-activated film 18 directly to the pressure sensitive adhesive 16 forming the two-part adhesive patch 10. Other configurations of patch can be used. For example, an intermediate layer (not shown) can be present between the pressure sensitive adhesive and the heat-activated film, if needed, to allow for the use of adhesives that may not be fully compatible with one another.

Pressure sensitive adhesives (PSAs) are viscoelastic materials in which a balance in the flow and resistance to flow play a role in the formation of bonds. Such materials are sufficiently soft to flow and provide tackiness, while they are sufficiently hard to resist flow when stress is applied on the substrate. One such PSA material suitable for use as a pressure sensitive adhesive in a sealing patch is an acrylic film, which serves as a back bone with, typically, a styrene butadiene coating that serves as a tacky viscoelastic substrate. In an embodiment, a suitable PSA is commercially available from Nova Films & Foils, Inc., of Bedford, Ohio under product code NF-1704.

Heat-activated films (HAF), which are also known as heat sensitive adhesives, are a dry adhesive that becomes tacky upon application of heat. These materials are typically formulated having a copolymer base material with one or more additives. The formulation is targeted to have a lower glass transition temp ($T_g$) and a higher melting point temperature ($T_m$) which can be varied based upon the specific application, to exhibit higher crystallization with minimal shrinkage. In HAFs crystallization is typically achieved faster, which correlates to a higher bonding strength. Polyester tends to be highly crystalline, which leads to a narrow melting temperature range, which is advantageous for high speed bonding. In an embodiment, the HAF can be a copolymer polyester, ethylene vinyl acetate (EVA), such as that commercially available from Adhesive Films, Inc., of Pine Brook, N.J. under product code EAF-230.

In determining the appropriate PSA 16 and HAF 18 for use, consideration should be given to a number of factors. For example, as noted above, the heat seal temperature (the temperature at which the HAF becomes tacky) should not exceed the ignition temperature of the materials being contained, for example 491° F. when used to contain cotton. In addition, the HAF 18 should not be tacky at normal operating temperatures, that is, prior to heating, as the material, e.g., the patch 10 and the bag 12 with the patch, may then be difficult to automate.

Other factors to consider are the differential in melting point temperature ($T_m$) of the of bag 12 materials and HAF 18, and the compatibility of the materials. For example, when the bags 12 are formed from PET and PE, consideration should be given to the melting point temperatures of the materials, e.g., PE, having a $T_m$ of about 320° F. to 360° F. and PET, having a $T_m$ of about 500° F. With respect to the compatibility of the materials, it is well known that polar materials adhere well to one another and that non-polar materials adhere well to one another, but polar and non-polar materials do not adhere well to one another. As such, given that PET is a polar material and PE is a non-polar material, there are difficulties in adhering these materials to each another. As such, in an embodiment of the patch 10, the PSA is a non-polar material, e.g., an acrylic film formulated with butadiene styrene, which is compatible with PE, and the HAF is a polar material, e.g., EVA, which is compatible with PET.

In an embodiment, the patch 10 can be fabricated so as to provide visual indication of the presence and location of the patch 10. For example, the patch 10 can be fabricated in a readily visually identifiable color (such as a bright orange or yellow) so that an operator can be assured that a bag 12 is properly oriented on the bagging system. For example, the patch can provided in a bright color so that an operator knows that the bag is placed with the patch side up on the bagging mandrel. That is, if the patch is not readily visible on the mandrel, then the bag is not properly positioned on the mandrel and must be repositioned, e.g., turned over, on the mandrel.

In another embodiment, the patch 10 can be provided with visual indication of a change of state. That is, the patch can be formulated with a constituent that changes color upon heating and activation of the heat-activated film 18 (as described below). The exemplary color change can be provided when a certain amount of energy has been absorbed by the heat-activated film or by exposure to a certain temperature. Those skilled in the art will recognize the various ways in which such visual indication can be provided.

Other configurations of heat sealing patches 10 are anticipated. For example, the patch 10 can be fabricated as more of a traditional laminate in which the PSA and HAF are applied to and carried on opposite sides of a non-removable substrate. All such configurations are within the scope and spirit of the present disclosure.

The patch 10 is applied to the bag 12 in which the compressible material is contained. In an embodiment, the bag 12 has a base material. In an embodiment, the bag 12 base material is fabricated from PET tapes woven or loomed together to form a sleeve or tube, such as that disclosed in Pearson, et al., published US patent application, Publication No. 2105/0075118, the disclosure of which is incorporated herein in its entirety. The outside of the tube can be coated with a polymeric coating, for example, polyethylene (PE). The woven PET tapes provide strength to the bag and the PE coating provides environmental protection, e.g., protection from moisture, water and other contaminants.

In an embodiment, the tube is then folded to form longitudinal gussets, as seen at 22 in FIG. 1, with the minor (smaller) sides folded inward toward one another to minimize the width of the folded bag. The tube is cut to a desired length and an end seal 24 is formed by known methods, such as stitching or the like to form the closed end of the bag. The other end of the bag 12 is open.

Figure 4:
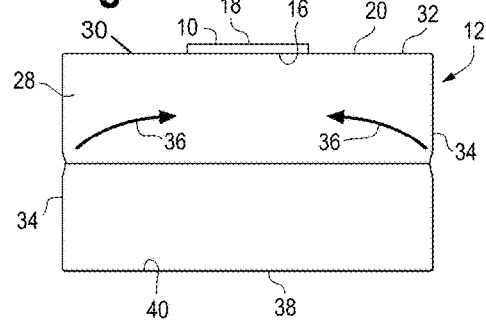
FIG. 4 is a view looking into the bag with the sealing patch on an outer surface of the bag.
Figure 5:
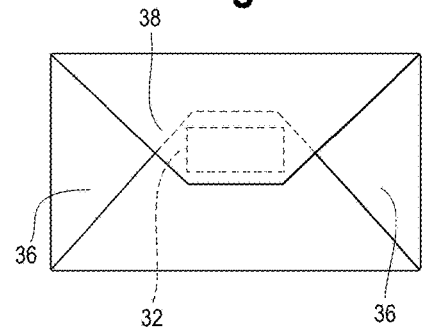
FIG. 5 is a view of the bag with the flaps folded to close the bag, and showing the sealing patch under an outermost (major) flap of the bag, the sealing patch shown in phantom lines to illustrate the approximate location of the sealing patch when the flaps are folded and the bag is sealed.

The patch is applied to the bag 12 near an open end 28 of the bag 12, about mid-way along the width $w_{12}$ of the bag 12, as illustrated in FIGS. 1 and 4. The patch 10 is applied with the pressure sensitive adhesive 16 adhered to the PE coated side 20 of the bag 12. The release sheet 26 is removed from the patch 10 and the patch 10 applied in the desired location on the outside surface 30 of the bag 12 on a major panel 32 of the bag as illustrated in FIG. 1. In this manner, because the HAF 18 has not yet been activated, the bag 12 with the patch 10 can be handled without concerns as to the "stickiness" of the patch 10 or concern as to misapplication of the patch 10. That is, since the HAF has not yet been activated, empty bags 12 can be stacked on top of each other and handled without the patch 10 from one bag 12 sticking to another bag.

In use, the compressible material is inserted into the bag 12. The material can be inserted into the bag 12 using, for example, the system and method disclosed in the aforementioned publications to Nyckowski et al. The open end of the bag 12 is folded with the minor panels 34 (the panels or flaps forming the gussets 22) folded inwardly, as indicated by the arrows at 36, onto the material. The first major panel 32, that is the panel with the patch 10, is then folded downward onto the minor panels 34 and the second or opposite major panel 38 is subsequently folded downward onto the first major panel 32. This positions the HAF 18 in contact with the bag 12 inside material (the PET side 40) of the second major panel 38.

Energy, in the form of heat, is then applied to the outside 30 of the second major panel 38. The heat is transferred through the PE coating and the PET material of the second major panel 38 and into the heat-activated film 18 on the first panel 32. The heat-activated film 18 is sufficiently heated to melt or activate the adhesive and fuses to the PET material with which it is in contact, to adhere the first and second major panels 32, 38 to one another, which, by virtue of the folded panels 32, 34, 38, closes or secures the end of the bag 12. In a present embodiment in which the HAF 18 is an EVA formulation, the HAF has a heat activation temperature of about 325° F. to about 375° F., and as such is heated to a temperature of abut 325° F. to about 375° F. to effect sealing.

Accordingly, an embodiment of a method for bagging a compressible material includes providing a bag 12 having a sealing patch 10 thereon. In an embodiment the bag 12 is formed from tapes of a polymeric material, such as PET, woven or loomed together to form a tube. In an embodiment, the tube has a polymeric coating 20 on an outer surface of the tube. In an embodiment the polymeric coating on the outside of the tube is polyethylene. The tube is folded to form longitudinal gussets as indicated at 22, is then cut to a desired length and an end seal 24 is made to close an end of the tube to form the bag 12.

In an embodiment, the method includes applying a sealing patch 10 to the bag 12. In a method, the sealing 10 patch has a carrier or release sheet 26 with a pressure sensitive adhesive (PSA) 16 on the release sheet 26 and a heat-activated film (HAF) 18 on the pressure sensitive adhesive 16. In an exemplary method, the PSA is an acrylic film, which serves as a back bone with, for example, a styrene butadiene coating that serves as a tacky viscoelastic substrate, and the HAF 18 is an EVA formulation, the HAF has a heat activation temperature of about 325° F. to about 375° F. The release sheet 26 is removed from sealing patch 10 and the patch 10 is applied to an outer surface of the bag 12.

In a method, the bag 12 is then filled with the compressible material, and the open end of the bag 12 is sealed. In an embodiment, the method includes folding the minor panels 34 (the panels or flaps forming the gussets 22) inwardly, as indicated by the arrows at 36, onto the material, and then folding the first major panel 32, that is the panel with the patch 10, downward onto the minor panels 34. The method further includes folding the second or opposite major panel 38 downward onto the first major panel 32 to position the HAF 18 in contact with the bag 12 inside material (the PET side 40) of the second major panel 38.

In an embodiment, the method includes applying energy, in the form of heat, to the outside 30 of the second major panel 38. The heat is transferred through the PE coating and the PET material of the second major panel 38 and into the heat-activated film 18 on the first panel 32, sufficiently heating the HAF to melt or activate the adhesive to adhere the first and second major panels 32, 38 to one another, to close or secure the end of the bag 12. In a method, after the bag 12 is sealed, the area around the seal is cooled.

Advantageously, the present sealing patch and method for sealing a bag that contains highly compressed materials without the use of wires or straps uses a heat-activated sealing patch in which the heat-activated material activates at a temperature of about 325° F. to about 375° F. At this temperature, the heat-activated material is sufficiently heated to activate the heat-activated material which fuses with the bag base material, PET, with which it is in contact. This temperature range is sufficiently high to activate the heat-activated material and to fuse the heat-activated material with the bag base material, but is not so high as to cause combustion of the material (such as cotton) contained in the bag. The method thus allows the use of heat sealing to seal a bag containing a bale of highly compressed material at temperatures sufficiently high to create a dependable seal, without adversely affecting the integrity of (for example, igniting) the compressed material within the bag, and sealing the bag without the use of stitching, staples cable-ties or zip ties.

Figure 7:
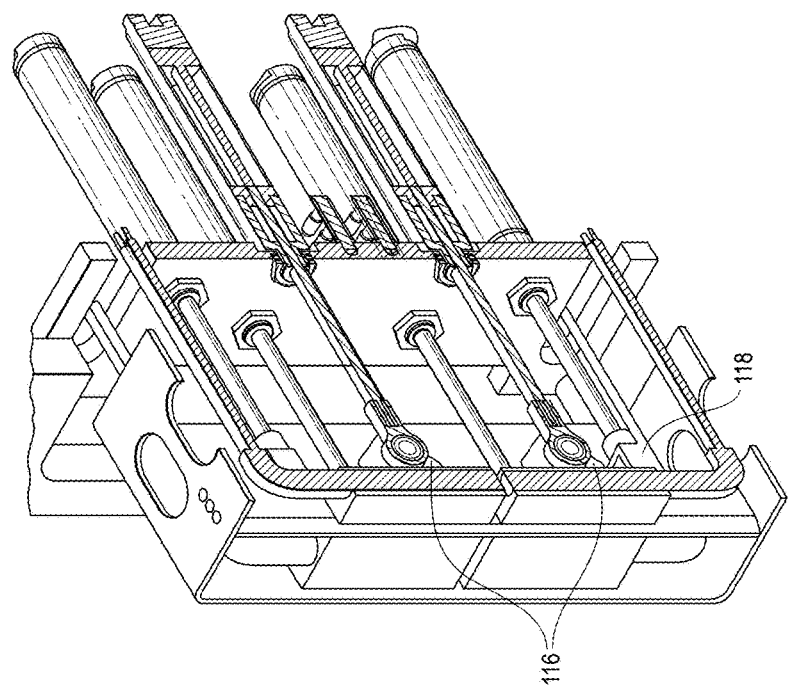
FIG. 7 is an illustration similar to FIG. 6 with portions of the device removed for clarity of illustration.
Figure 6:
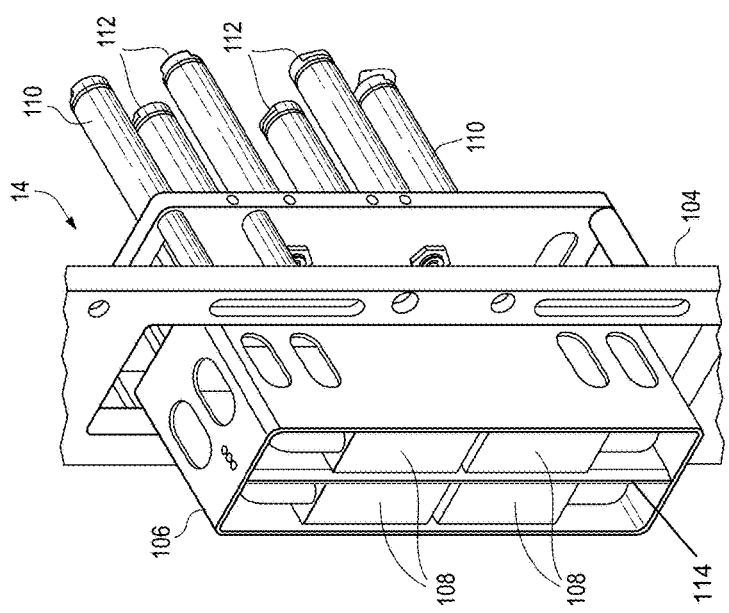
FIG. 6 is a perspective illustration of an embodiment of a heat sealing device for heat sealing the filled bag.

An embodiment of a device 14 for heat sealing the bags 12 is illustrated in FIGS. 6 and 7. The device 14 can be mounted to an end of a bagging system, such as that disclosed in the aforementioned published patent applications to Nyckowski et al. In an embodiment, the device 14 includes a frame 104, a compression element 106 mounted to the frame 104, and one or more heaters 108. In an embodiment, the compression element 106 is mounted for reciprocating movement relative to the frame 104 by, for example, cylinders 110 mounted to the compression element 106 and the frame 104. In an embodiment, the compression element 106 is formed as an elongated rectangular ring. The heaters 108 are likewise mounted for reciprocating movement relative to the frame 104 and, in an embodiment, are also mounted by cylinders 112. An embodiment of the device 14 includes coolers 114, such as an air cooler, to cool the bags 12 and/or the heaters 108 following heat sealing. In an embodiment the coolers 114 are, for example, forced air blowers and are mounted to or configured as part of the compression elements 106.

In an embodiment, the heaters 108 are mounted to the cylinders 112 using movable pivoting or gimbal mounts 116 to allow for some freedom of movement to provide positive contact of the heaters 108 with the end of the filled bag 12. Because the end of the bag 12 may not be perfectly flat, the movable mounts 116 permit movement of the heaters 108 so that the end face heaters 108 lie flat on the end of the bag 12 and provide adequate and efficient transfer of heat into the bag 12 and heat-activated film 18. Likewise, the compression element 106 may be mounted to the cylinders 110 by pivoting mounts 118 to assure good contact between the compression element 106 and the bag 12.

It will also be appreciated by those skilled in the art that the relative directional terms such as sides, upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A method for sealing a bag formed from a polymeric base material having a polymeric coating material on an outer surface of the base material, one end of the bag having a pair of first and second opposing major flaps and a pair of minor flaps between the first and second major flaps, the coating material have a melting point less than a melting point of the base material, the bag further including a sealing patch having a pressure sensitive adhesive side and a heat-activated material side, the pressure sensitive adhesive side of the sealing patch adhered onto the coating material of the first major flap, the method comprising:
   filling the bag with compressible material and, afterwards,
   closing the end of the bag by:
   folding the minor flaps inward;
   folding the first major flap inward onto the minor flaps;
   folding the second major flap inward onto the first major flap so as to overlie the sealing patch;
   contacting the second major flap with a heater; and
   activating the heater to heat the sealing patch through the coating material and the base material of the second major flap such that the heat-activated material of the sealing patch activates and adheres the first and second major flaps to one another.

2. The method of claim 1, wherein activating the heater comprises activating the heater to heat the heat-activated material of the sealing patch to a temperature of about 325 degrees Fahrenheit to about 375 degrees Fahrenheit.

3. The method of claim 1, further comprising, after the first and second major flaps are adhered to one another, activating a cooler to direct air onto the bag to cool the bag.

4. The method of claim 1, wherein a heat-sealing device comprises a compression element and the heater, the method further comprising contacting the second major flap with the compression element.

* * * * *